United States Patent [19]

Sorsche et al.

[11] Patent Number: 4,598,604
[45] Date of Patent: Jul. 8, 1986

[54] STEERING DEVICE FOR MOTOR VEHICLES, ADJUSTABLE ALONG ITS LONGITUDINAL AXIS

[75] Inventors: Joachim H. Sorsche, Stuttgart-Schoenberg; Karl Peitsmeier, Neuhausen, both of Fed. Rep. of Germany

[73] Assignee: Daimler-Benz Aktiengesellschaft, Fed. Rep. of Germany

[21] Appl. No.: 612,556

[22] Filed: May 21, 1984

[30] Foreign Application Priority Data

May 25, 1983 [DE] Fed. Rep. of Germany ....... 3318935

[51] Int. Cl.$^4$ .............................................. B62D 1/18
[52] U.S. Cl. .................................... 74/493; 74/425
[58] Field of Search .................. 74/409, 425, 493; 280/775

[56] References Cited

U.S. PATENT DOCUMENTS

| 2,769,351 | 11/1956 | Serfling et al. | 74/493 |
| 2,836,988 | 6/1958 | Cashman | 74/493 |
| 3,302,478 | 2/1967 | Pauwels | 74/493 |
| 3,396,600 | 8/1968 | Zeigler et al. | 74/493 |

FOREIGN PATENT DOCUMENTS

| 2331632 | 1/1974 | Fed. Rep. of Germany | 74/493 |
| 2311236 | 12/1976 | France | 74/425 |

*Primary Examiner*—Craig R. Feinberg
*Attorney, Agent, or Firm*—Craig and Burns

[57] ABSTRACT

A steering device for motor vehicles, which is adjustable along its longitudinal axis and whose steering column can be telescopically extended and retracted by means of a drive device, the steering column jacket being designed in several parts, one steering column jacket part being fixed to the body and one steering column jacket part being movable relative to the first, and in which adjustment can be introduced into the steering column jacket movable part by means of a coupling element with which a worm gear driven by a drive motor engages. The coupling element consists of a toothed rack located on the periphery of the steering column jacket movable part, a worm gear located with its axis parallel to the rack engaging with the rack and passing through a recess in the steering column jacket fixed part. The engagement angle of the worm gear is so dimensioned that self-locking occurs.

8 Claims, 2 Drawing Figures

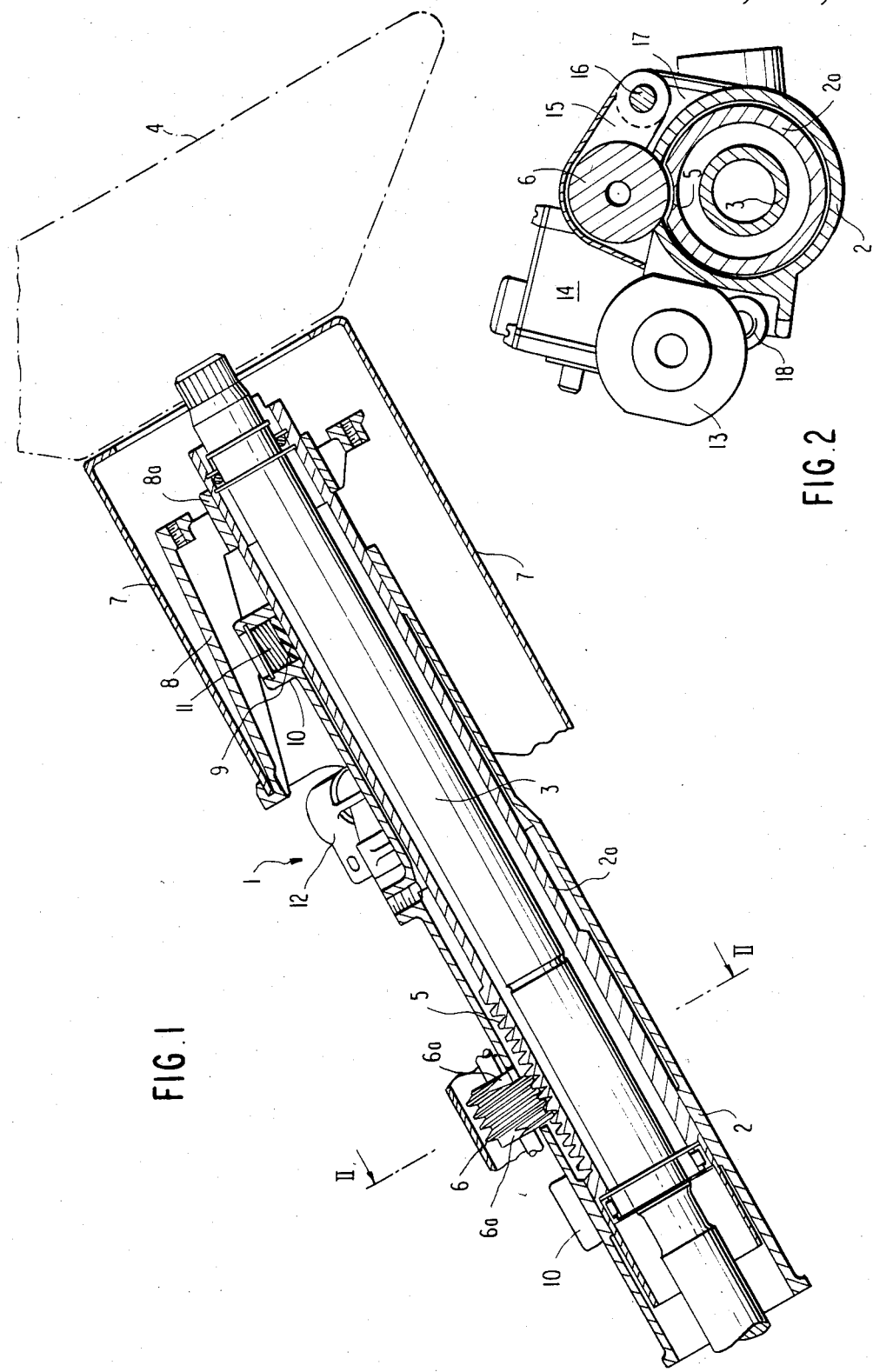

STEERING DEVICE FOR MOTOR VEHICLES, ADJUSTABLE ALONG ITS LONGITUDINAL AXIS

The invention concerns a steering device for motor vehicles, which is adjustable along its longitudinal axis wherein the steering column can be telescopically extended or retracted, by means of a drive device, with a choice of direction by means of a switching device, in which a steering column jacket is designed to have at least two parts and one of the steering column jacket parts is fixed to the body and at least one of the steering column jacket parts, which is co-axial and at least substantially concentric with the first, is movable relative to the steering column jacket fixed part and is guided axially by it, and at least one upper part of the steering spindle carrying a steering wheel is rotatably supported, with security against axial displacement, in the steering column jacket movable part, and in which the adjustment movement can be introduced into the steering column jacket movable part by means of a coupling element with which a worm gear driven by a drive motor engages.

A steering device of this type, inter alia, adjustable along its longitudinal axis and whose adjustment takes place by means of auxiliary power, is known from German Pat. No. 3,229,481. Adjustment of the steering column executed exclusively by means of auxiliary power is particularly advantageous for two reasons compared with the manually actuated adjustment devices, which have been known for a long time. Since there is no necessity for operating elements such a levers or the like, the intensity of the locking of the adjustment device after an adjustment process no longer depends on the care of the operator and no operating elements protrude into the steering column area causing danger of injury. This fact alone makes an important contribution to increasing passive accident safety for the driver of the vehicle. A substantial disadvantage of this known steering device adjustable by means of auxiliary power is, however, to be found in extremely expensive setting mechanism for the longitudinal adjustment of the steering column, which also requires a relatively large installation space.

The object of the invention is, therefore, to develop the known adjustment mechanism of a steering device, with power assisted adjustment along its longitudinal axis, in such a way that it is more compact in construction and permits a reduction in the number of components necessary to convert the rotational movement which can be initiated by the auxiliary power into a translational movement.

This object is attained, in accordance with the invention, by means of a coupling element which comprises a toothed rack located on the periphery of the steering column jacket movable part and the worm gear, which is located with its axis parallel to a steering column jacket movable part, engages in a toothed rack and passes through a recess in the steering column jacket fixed part, the engagement angle of the worm gear being so dimensioned that it precludes the introduction of rotary momentum into the worm gear, such introduction being something to be avoided even in the case of substantial axial load on the rack.

According to the invention, a preferred type of adjustment path limitation is effected by means of radial stop surfaces on the worm gear. Compared with axial stops, this prevents overrun of the worm gear in the toothed rack, which overrun led to increased wear on the flanks of the teeth. Compared with electrical switching elements, which sense the end positions, this mechanical solution has the advantage of less tendency to failure.

The adjustability of the rack drive, in accordance with another feature of the invention, is to be regarded as advantageous in that, by this means, even an unbalanced utilization of the bearing capacity of the flanks of the teeth is maintained along the complete longitudinal extent of the worm gear. Zero play setting and adjustment of the rack drive takes place by reducing the distance between the rack longitudinal axis and the worm longitudinal axis.

The worm gear is supported, on the steering column jacket fixed part, pivotably about a pin with its axis parallel to the toothed rack and the distance between the worm gear and the toothed rack can be varied by means of an adjustment device. Because of the positive guidance of the worm shaft, setting and adjustment of the worm gear is only possible with the axis in the parallel position. Furthermore, this arrangement is particularly suitable for stepless automatic adjustment by the effect of spring preloading, which has the advantage of almost complete freedom from maintenance.

In a particular embodiment of a steering column jacket movable part, the rack is formed by teeth cut in the wall of the steering column jacket movable part. A separate rack becomes unnecessary because the rack is cut in the wall of the steering column jacket movable part. In addition to the advantage of material and hence weight saving, the possibility is retained of using hollow cylindrical sections as the steering column jacket, which has a favorable effect on the manufacturing techniques for the latter.

The teeth of the rack are of the enveloping type. Because of the engagement of the worm gear in the enveloping teeth of the rack, which is in turn a component of the steering column jacket movable part, there is an advantageous side effect in the form of a torsional lock between the movable and fixed parts of the steering column jacket, so that there is no need for additional longitudinal guides.

The type of support for the steering column jacket movable part in the steering column jacket fixed part, wherein the steering column jacket movable part is supported with zero play in the steering column jacket fixed part in such a way that the movable part bears against at least two spring loaded pressure pieces, should be considered as a means of increasing tolerances. The production by manufacturing techniques of two hollow cylinders, which (for weight reasons) have relatively thin walls, such that, using conventional support means, they can interact telescopically practically without play, involves very great machining expense, on the one hand, and a large fitting effort on the other.

The foregoing and other objects, features, and advantages of the present invention will become more apparent from the following description when taken in connection with the accompanying drawings which show, for the purposes of illustration only, one embodiment in accordance with the present invention, and wherein:

FIG. 1 shows a longitudinal section through the upper region of a steering column, and FIG. 2 shows a section along the line II—II in FIG. 1.

Reference is now made to the drawings, wherein like elements carry like reference numerals.

The construction of a steering column 1 can be seen in FIG. 1. The steering column jacket of the steering column 1 is designed in two parts and consists of an outer steering column jacket part 2, which can be fixed to the body, and an inner steering column jacket part 2a which interacts telescopically with the outer steering column jacket part 2. In the inner steering column jacket part 2a, a steering spindle 3, which is connected at its free end so as to rotate with a steering wheel 4 (shown chain-dotted), is supported so that it can rotate but is secure against axial displacement. A lower region of the inner steering column jacket part 2a has a larger wall thickness, an enveloping rack 5 being milled out of its outer periphery. A worm gear 6 engages in the rack 5, passing through a recess in the steering column jacket part 2. On rotation of the worm gear 6, the steering column jacket part 2a is driven either out or in, depending on the direction of rotation. The adjustment region is limited by radial stop surfaces 6a, which make contact on the toothed rack in the end positions. The worm gear 6 has an engagement angle of 20 degrees. This engagement angle ensures that no rotary momentum is introduced into the worm gear 6, even with substantial axial loading on the rack. This is of substantial importance on account of the passive safety of modern steering columns because they are intended to absorb impact energy by deliverage deformation. In order to ensure the order of deformation in a combination of several deformation elements, such as the impact shell and the corrugated tube, and in order to avoid acceleration peaks it is necessary to have "rigid behavior" of the steering column as a basis.

The worm gear 6 is driven, as will be described in more detail by reference to FIG. 2, by an electric motor and can be controlled by a manually actuable tumbler key with preselection of the direction of rotation and it can therefore be moved into any desired position within the adjustment range. The tumbler key can be located, for ease of use, on the dashboard or in a fairing 7 of the steering column 1. The fairing 7 is fastened to a holder 8, which is in turn frictionally connected to a neck of the steering column jacket part 2a by means of a clamping ring 8a. The holder 8 also serves as the console for switch devices such as combination direction indicator switches or the like and by this means ensures that the distance between the corresponding actuation levers protruding from the steering column and the steering wheel 4 remains constant for every setting of the steering column 1.

Two spring loaded pressure pieces 9, of which only one is visible due to the sectioning arrangement in FIG. 1, are provided on the steering column jacket fixed part 2, in order to provide zero play support of the steering column jacket part 2a in the steering column jacket part 2. They are retained radially by bushes 10 of annular cross-section and are loaded on their end face by the preloading of a compression spring 11. By this means, the manufacturing tolerances for the steering column jacket parts 2 and 2a can be more generously selected and the manufacturing costs, therefore, reduced without function being adversely affected.

A housing 12 for accepting the locking mechanism of a steering lock is located on the steering column jacket stationary part 2 and cannot, therefore, execute any travel movement. So that the steering can, nevertheless, still be locked in any adjustment position, a penetration opening corresponding to the length of the adjustment path of the steering column 1 is provided in the steering column jacket part 2a for a locking element which can engage in an elongated hold of a locking ring, which is in itself known and is not shown.

The necessary length compensation for the steering spindle 3 along the adjustment path of the steering column 1 takes place by means of a splined shaft/hub connection in the lower region, now shown, of the steering column 1.

FIG. 2 shows the arrangement of the drive for the worm gear 6. The drive is formed by a module consisting of an electric motor 13, a reduction gear 14, the worm gear 6 and an arm 15. This module is supported pivotably about a pin 16 having its axis parallel to the rack 5, which pin 16 is in turn guided in a bearing block 17 protruding from the steering column jacket part 2. The rack drive consisting of the worm gear 6 and the rack 5 has tooth flank orientation and bottom clearance. This makes it possible to set and adjust the rack drive to zero play by reducing the distance between the toothed rack longitudinal axis and the worm longitudinal axis. The positive guidance provided by the pivotable module guarantees that changes in the distance apart always occur with the axes parallel. In order to secure the adjustment of the rack drive at any time, an adjustment device 18 is used. This adjustment device 18 can consist of an elongated hole adjustment, an eccentric adjustment device or, in the case of stepless adjustment, a preloaded spring.

The engagement of the worm gear 6 in the enveloping rack 5, which envelops the attendant pinion by engaging the teeth of the pinion throughout an area described about the axis of the pinion, simultaneously provides security against twisting of the steering column jacket part 2a relative to the steering column jacket part 2. This provides the advantage, in addition to the compact construction, that separate longitudinal guides are unnecessary on the outer periphery of the steering column jacket part 2a or the inner periphery of the steering column jacket part 2.

The embodiment example of a steering column adjustable along its longitudinal axis by an electric motor makes it clear that the rotational movement derived from auxiliary power can be converted directly, by means of a worm gear, into a translational movement of a steering column jacket part and that at the same time only minimum installation space is required.

While we have shown and described only one embodiment in accordance with the present invention, it is understood that the same is not limited thereto but is susceptible to numerous changes and modifications as known to one having ordinary skill in the art, and we therefore do not wish to be limited to the details shown and described herein, but intend to cover all such modifications as are encompassed by the scope of the appended claims.

We claim:

1. A steering device for motor vehicles, adjustable along its longitudinal axis and with a steering column telescopically extendable and retractable in response to a drive device, and switch means for controlling direction of telescopic movement wherein a steering column jacket comprises at least two parts, a first of the steering column jacket parts being fixed to a vehicle body and at least a second of the steering column jacket parts has an axis which is co-axial and at least substantially concentric with the first and being moveable relative to the first steering column jacket fixed part and guided axially by the first part, at least one upper part of a steering spindle carrying a steering wheel being rotatably supported and secured against axial displacement in the second steering column jacket moveable part, coupling means for introducing adjustment movement into the steering column jacket moveable part and wherein the coupling means comprises a toothed rack located on just one side of a periphery of a lower half the steering column jacket moveable part and a worm gear driven by a drive motor located with the worm gear having an axis parallel to and spaced from the axis of the steering column jacket moveable part directly engaging the toothed rack through a recess in the steering column jacket fixed part, the engagement angle of the worm gear with the toothed rack dimensioned to preclude introduction to rotary momentum into the worm gear during substantial axial load on the rack.

2. A steering device in accordance with claim 1, further comprising
radial stop means on the worm gear for limiting the adjustment path of the steering column jacket moveable part.

3. A steering device in accordance with claim 1, further comprising spring loaded pressure means for supporting the steering column jacket moveable part with zero play in the steering column jacket fixed part.

4. A steering device in accordance with claim 1, wherein the toothed rack comprises teeth cut in the wall of the steering column jacket moveable part.

5. A steering device in accordance with claim 4, wherein the teeth of the rack are of the enveloping type.

6. A steering device in accordance with claim 1, wherein zero play setting is achieved by reducing the distance between the rack toothed longitudinal axis and the worm gear longitudinal axis.

7. A steering device in accordance with claim 6, further comprising
pin means for pivotally supporting the worm gear on the steering column jacket fixed part, with the worm gear axis parallel to the toothed rack and adjusting means for varying the distance between the worm gear and the toothed rack.

8. A steering device in accordance with claim 7, further comprising
spring loading means for effecting stepless automatic adjustment of the toothed rack.

* * * * *